United States Patent
Saini et al.

(10) Patent No.: US 11,205,111 B2
(45) Date of Patent: Dec. 21, 2021

(54) END OF PERIOD METRIC PROJECTION WITH INTRA-PERIOD ALERTS

(71) Applicant: Adobe Inc., San Jose, CA (US)

(72) Inventors: Shiv Kumar Saini, Bangalore (IN); Prakhar Gupta, Bengaluru (IN); Harvineet Singh, Bengaluru (IN); Gaurush Hiranandani, Jaipur (IN)

(73) Assignee: ADOBE INC., San Jose, CA (US)

( * ) Notice: Subject to any disclaimer, the term of this patent is extended or adjusted under 35 U.S.C. 154(b) by 1101 days.

(21) Appl. No.: 15/609,254

(22) Filed: May 31, 2017

(65) Prior Publication Data

US 2018/0349756 A1 Dec. 6, 2018

(51) Int. Cl.
| | |
|---|---|
| *G06N 3/04* | (2006.01) |
| *G06N 7/00* | (2006.01) |
| *G06F 8/77* | (2018.01) |
| *G06N 3/08* | (2006.01) |
| *G06F 8/70* | (2018.01) |

(52) U.S. Cl.
CPC .......... *G06N 3/0445* (2013.01); *G06F 8/77* (2013.01); *G06N 3/0454* (2013.01); *G06N 3/0481* (2013.01); *G06N 3/084* (2013.01); *G06F 8/70* (2013.01)

(58) Field of Classification Search
CPC . H04L 63/1425; H04L 41/147; H04L 41/142; G06F 11/3452; G06N 20/00
See application file for complete search history.

(56) References Cited

U.S. PATENT DOCUMENTS

2004/0249775 A1* 12/2004 Chen .................. G06E 1/00
706/21
2015/0381648 A1* 12/2015 Mathis ................ H04L 29/06

OTHER PUBLICATIONS

Krishnamurti TN, Chakraborty A, Krishnamurti R, Dewar WK, Clayson CA, "Seasonal prediction of sea surface temperature anomalies using a suite of 13 coupled atmosphere-ocean models," Journal of climate, Dec. 19, 2006 (23):6069-88. (Year: 2006).*
Clement L, Thas O, Ottoy JP, Vanrolleghem PA. "Data management of river water quality data: A semi-automatic procedure for data validation," Water Resources Research. Aug. 2007; 43(8). (Year: 2007).*

(Continued)

*Primary Examiner* — Ann J Lo
*Assistant Examiner* — Scott R Gardner
(74) *Attorney, Agent, or Firm* — F. Chau & Associates, LLC

(57) ABSTRACT

Techniques of forecasting web metrics involve generating, prior to the end of a period of time, a probability of a metric taking on an anomalous value, e.g., a value indicative of an anomaly with respect to web traffic, at the end of the period based on previous values of the metric. Such a probability is based on a distribution of predicted values of the metric at some previous period of time. For example, a web server may use actual values of the number of bounces collected at hourly intervals in the middle of a day to predict a number of bounces at the end of the current day. Further, the web server may also compute a confidence interval to determine whether a predicted end-of-day number of bounces may be considered anomalous. The width of the confidence interval indicates the probability that a predicted end-of-day number of bounces has an anomalous value.

20 Claims, 9 Drawing Sheets

(56) References Cited

OTHER PUBLICATIONS

Farren, Derek. "Predicting retail website anomalies using Twitter data." (2012). (Year: 2012).*
Tan et al., "PREPARE: Predictive Performance Anomaly Prevention for Virtualized Cloud Systems, 2012 32nd IEEE International Conference on Distributed Computing Systems," (Year: 2012).*
Chauhan S, Vig L. Anomaly detection in ECG time signals via deep long short-term memory networks. In 2015 IEEE International Conference on Data Science and Advanced Analytics (DSAA) Oct. 19, 2015 (pp. 1-7). IEEE. (Year: 2015).*
Ahmad et al., "Real-Time Anomaly Detection for Streaming Analytics," arXiv:1607.02480v1, Jul. 8, 2016 (Year: 2016).*
Duan et al., "Travel Time Prediction with LSTM Neural Network," 2016 IEEE 19th International Conference on Intelligent Transportation Systems (ITSC), Rio de Janeiro, Brazil, Nov. 1-4, 2016 (Year: 2016).*
Gers, et al., "Applying LSTM to Time Series Predictable Through Time-Window Approaches", in International Conference on Artificial Neural Networks, Springer, 2001, pp. 669-676.
Giles, et al., "Noisy Time Series Prediction using a Recurrent Neural Network and Grammatical Inference", Machine Learning, vol. 44, No. 1/2, 2001, 31 pages.
Hinton, et al., "Neural networks for machine learning", Lecture 6a, Overview of mini-batch gradient descent, 2012, 31 pages.
Hochreiter, et al., "Long Short-Term Memory", Neural Computation 9(8): 1735-1780, 1997, 32 pages.
Hyndman, et al., "A state space framework for automatic forecasting using exponential smoothing methods", International Journal of Forecasting 18.3, 2002, pp. 439-454.
Ng, "Sparse autoencoder", CS294A Lecture notes 72.2011 (2011): 1-19. URL: https://web.stanford.edu/class/cs294a/sparseAutoencoder_2011new.pdf, downloaded on Mar. 31, 2017.

* cited by examiner

END OF PERIOD METRIC PROJECTION WITH INTRA-PERIOD ALERTS

TECHNICAL FIELD

This description relates to forecasting values of website-related metrics using web analytics.

BACKGROUND

Web analytics tools provide tracking and aggregation of values of specified metrics at various time intervals, e.g., daily, hourly, etc. For example, an online marketing firm may wish to know a number of bounces (i.e., visitors to a website that enter and leave without viewing other pages within the website) in a given day. Further, some web analytics tools provide forecasting of values of the specified metrics. For example, based on a past history, conventional web analytics techniques provide a prediction of an expected number of bounces for the next day. Such forecasting allows for alerts to be sent to interested parties when the values of the metrics take on anomalous values.

SUMMARY

In one general aspect, a method can include receiving, by processing circuitry of a web server configured to host a website and analyze metrics related to the website, values of a metric over a previous period of time. The method can also include generating, by the processing circuitry, a distribution of predicted values of the metric at the end of the previous period of time based on the received values of the metric over the previous period of time. The method can further include, after generating the distribution of predicted values of the metric at the end of the previous period of time, receiving, by the processing circuitry, values of the metric during the current period of time. The method can also include, prior to the end of the period of time, generating, by the processing circuitry, a probability of the metric having an anomalous value at the end of the current period of time based on the generated distribution of predicted values of the metric at the end of the previous period of time. The method can further include performing, by the processing circuitry, a remedial action in response to the probability of the metric having the anomalous value at the end of the current period of time, exceeding a specified threshold value.

The details of one or more implementations are set forth in the accompa-nying drawings and the description below. Other features will be apparent from the description and drawings, and from the claims.

DETAILED DESCRIPTION

Figure 1:
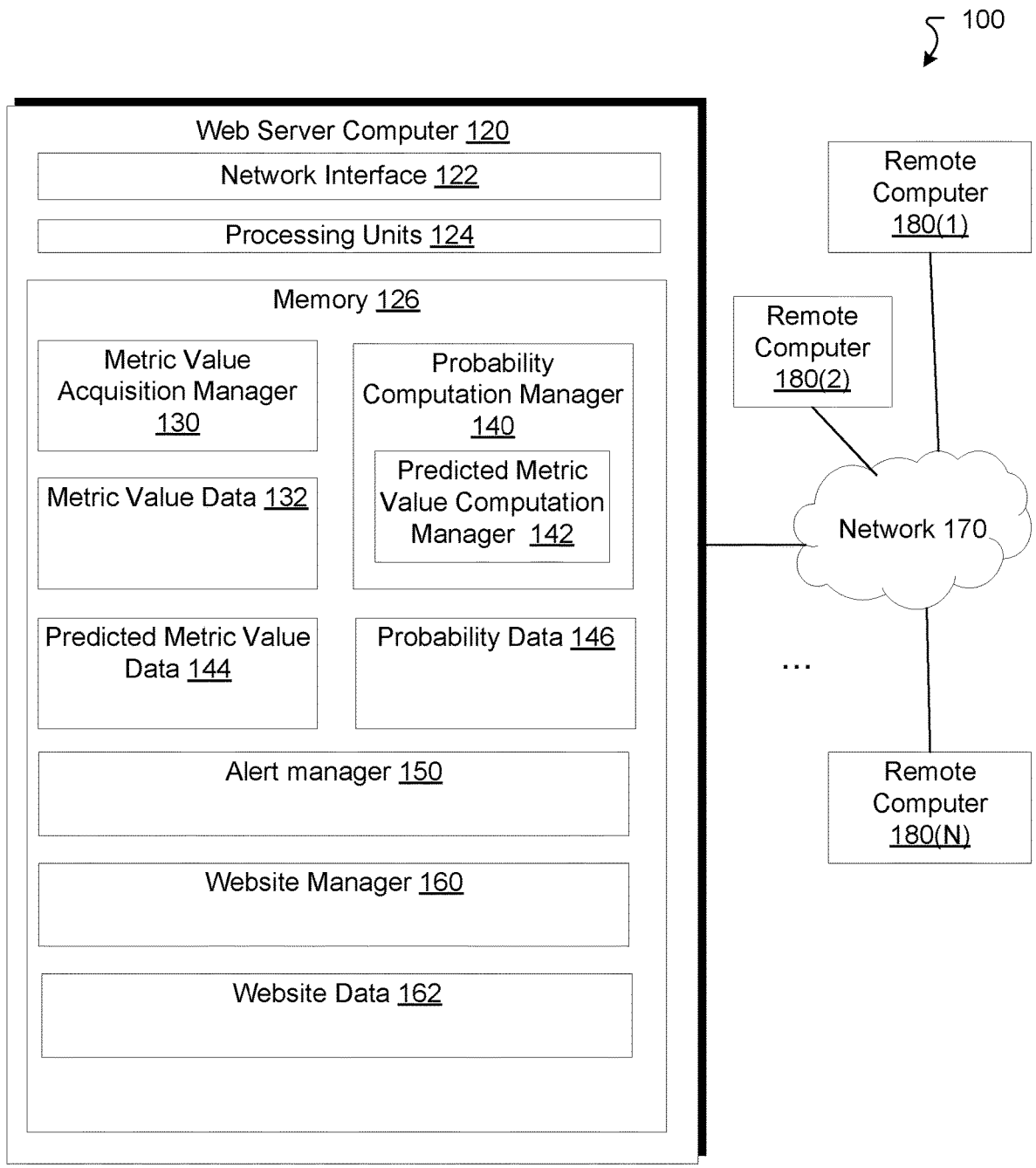
FIG. 1 is a diagram that illustrates an example electronic environment in which improved techniques described herein may be implemented.

In conventional forecasting techniques provided by web analytics tools as described above, a web server may send alerts to a user in response to a value of a metric taking on an anomalous value. Nevertheless, while the forecasting provides useful information, such information is a lagged indicator. One may only take remedial action to correct a web campaign whose metrics are taking on anomalous values for a day once the day is completed. For example, there is no way to warn a user that a website is predicting a greater number of bounces than usual before the day has finished. Further, there is no way to adjust an expected number of bounces at the end of the day before the day has finished.

In such cases, an operator of a web site may have to wait until after the end of a day before making adjustments to a website in response to anomalous metric values. Further, because the end-of-day metric value is a lagged indicator, such waiting may cause the operator of a website to take actions that do not address the current issues causing the anomalous metric values. For example, it may occur that the number of bounces at the end of a day is significantly larger than the predicted value. Such an anomalous value points not to current potential problems with the website, but to problems that occurred at least a day before. Accordingly, it is difficult to assess whether a fix to that problem will result in some other increase in bounces at the end of the next day.

One potential solution to this problem of lagging indicators is to use hourly metric value data during a day to predict the metric value at the end of the day. In this scenario, one would add up all of the hourly contributions to the metric value up to the current hour, and forecast, based on this aggregation, using a time series analysis (TSA). Nevertheless, such hourly data provided poor-quality forecasts because a conventional TSA only considers forecasting errors made during the previous day.

In accordance with the implementations described herein, improved techniques of forecasting involve generating, prior to the end of a period of time, a probability of a metric taking on an anomalous value, e.g., a value indicative of an anomaly with respect to web traffic, at the end of the period based on previous values of the metric. Such a probability is based on a distribution of predicted values of the metric at some previous period of time. For example, a web server may use actual values of the number of bounces collected at hourly intervals in the middle of a previous day to compute a confidence interval that determines whether a predicted end-of-day number of bounces may be considered anomalous, i.e., greater than a specified number. The width of the confidence interval indicates the probability that a predicted end-of-day number of bounces has an anomalous value.

Such techniques improve the operation of the web server by improving the web server's accuracy in predicting whether a metric is taking on an anomalous value during a period. This improvement is derived from the fact that the distribution of predicted values considers errors made in the predicted values not only in a previous period but also between various subperiods. Ultimately, this improvement enables the web server to make more timely and effective adjustments to a web site in response to a sufficiently high confidence that the metric will take on an anomalous value by the end of a day.

FIG. 1 is a diagram that illustrates an example electronic environment 100 in which the above-described improved techniques may be implemented. As shown, in FIG. 1, the electronic environment 100 includes a web server computer 120, a network 170, and remote computers 180(1), . . . , 180(N).

The web server computer 120 is configured to host a website, analyze data generated by the website, and make forecasts about web traffic based on the data. The web server computer 120 includes a network interface 122, one or more processing units 124, and memory 126. The network interface 122 includes, for example, Ethernet adaptors, Token Ring adaptors, and the like, for converting electronic and/or optical signals received from a network to electronic form for use by the web server computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the web server computer 120 can be, or can include processors (e.g., processing units 124) configured to process instructions stored in the memory 126. Examples of such instructions as depicted in FIG. 1 include a metric value acquisition manager 130, a probability computation manager 140, an alert manager 150, and a website manager 160. Further, as illustrated in FIG. 1, the memory 126 is configured to store various data, which is described with respect to the respective managers that use such data.

The metric value acquisition manager 130 is configured to produce actual values of metrics 132 from website data 162. For example, suppose that the web server computer 120 is configured to collect data regarding a number of bounces per day in a website managed by a website manager 160. The metric value acquisition manager 160 may receive an indication that a bounce has occurred from the website manager 160. The metric value acquisition manager 130 may then aggregate such indications hourly (or half-hourly, or every other hour, every ten minutes, etc.) and store the aggregate metric values as the metric value data 132.

The probability computation manager 140 is configured to compute a probability 146, or likelihood, that an end-of-period metric value generated during a period (e.g., a day) will take an anomalous value. Such a probability can be used to warn a user to take remedial action before the end of the period in order to bring the end-of-period metric value to a non-anomalous value. To effect such a probability computation, the probability computation manager 140 includes a predicted metric value computation manager 142.

The predicted metric value computation manager 142 is configured to generate predicted end-of-period metric values 144 from the metric value data 132. Such predictions are generated from the metric value data 132 using any of several prediction models, some of which will be described herein. For example, in some implementations, the predicted metric value computation manager 142 is configured to, at a particular hour, predict the metric value for that hour by using a model for the metric value data 132 taken in previous days at that hour (e.g., predicted metric value at 2 PM is based on the model for all 2 PM values from previous days). In some implementations, the predicted metric value computation manager 142 is configured to use a linear regression of the modeled metric values with residuals between predicted and actual metric values evaluated at previous hours (e.g., at 1 PM, 12 PM, 11 AM, 10 AM, and 9 AM). In some implementations, the predicted metric value computation manager 142 is configured to use a recurrent neural network (RNN) to derive the predicted metric value data 144.

In some implementations, the predicted metric value computation manager 142 is configured to generate a distribution of predicted values of the metric at the end of a previous period of time. The generation of such a distribution is described in detail with respect to FIG. 8. Generally, the metric value acquisition manager 130 receives metric values 132 from a previous period of time. The predicted metric value computation manager 142 may then generate such a distribution based on these metric values 132 from the previous period of time. The probability computation manager 140 may then compute a probability that the metric takes on an anomalous value at the end of a current period of time using this distribution of metric values.

Based on a predicted metric value 144, the probability computation manager 140 may then determine within some confidence interval whether the predicted metric value 144 is anomalous or is indicative of an anomaly. For example, the probability computation manager 140 may, via a bootstrapping technique, generate a probability distribution of predicted metric values for a given hour, e.g., 2 PM. The probability computation manager 140 may then use this distribution to indicate whether a new predicted metric value 144 is outside of some confidence interval, e.g., either above the 97.5 percentile of the predicted metric values or below the 2.5 percentile of the predicted metric values. The probability computation manager 140 may then store such indications as probability data 146.

The alert manager 150 is configured to generate an alert in response to one or more predicted metric values 144 being indicated in probability data 146 as being outside of a confidence interval and likely anomalous. The alert manager 150 is also configured to send a generated alert to a user, e.g., a human administrator of the website. An alert may take the form of an email, a text message, a phone call, or if the user is expected in the same location as the web server computer 120, a sound and/or a display message.

For example, suppose that a website computes a distribution of predicted number of bounces at the end of a day as having a mean of 10,000, with a 97.5 percentile value of 12,500 bounces. If a new predicted value (not derived from bootstrapping) takes a value greater than 12,500 bounces, then the alert manager will send an alert to the user. In response, the user may attempt some remedial action such as adjusting the website to reduce the number of bounces prior to the day's end.

The network 170 is configured and arranged to provide network connections between the web server computer 120 and the remote computers 180(1), . . . , 180(N) that may access the website. The network 170 may implement any of a variety of protocols and topologies that are in common use for communication over the Internet or other networks. Further, the network 170 may include various components (e.g., cables, switches/routers, gateways/bridges, etc.) that are used in such communications.

The components (e.g., modules, processing units 124) of the web server computer 120 can be configured to operate based on one or more platforms (e.g., one or more similar or different platforms) that can include one or more types of hardware, software, firmware, operating systems, runtime libraries, and/or so forth. In some implementations, the components of the web server computer 120 can be configured to operate within a cluster of devices (e.g., a server farm). In such an implementation, the functionality and processing of the components of the Web server computer 120 can be distributed to several devices of the cluster of devices.

The components of the web server computer 120 can be, or can include, any type of hardware and/or software configured to process attributes. In some implementations, one or more portions of the components shown in the components of the web server computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the web server computer 120 can be, or can include, a software module configured for execution by at least one processor (not shown). In some implementations, the functionality of the components can be included in different modules and/or different components than those shown in FIG. 1.

Although not shown, in some implementations, the components of the user device 120 (or portions thereof) can be configured to operate within, for example, a data center (e.g., a cloud computing environment), a computer system, one or more server/host devices, and/or so forth. In some implementations, the components of the web server computer 120 (or portions thereof) can be configured to operate within a network. Thus, the components of the web server computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the web server computer 120 can be, or can include, processors configured to process instructions stored in a memory. For example, a metric value acquisition manager 130 (and/or a portion thereof), an probability computation manager 140 (and/or a portion thereof), an alert manager 150 (and/or a portion thereof), and a website manager 160 (and/or a portion thereof) can be a combination of a processor and a memory configured to execute instructions related to a process to implement one or more functions.

Figure 2:
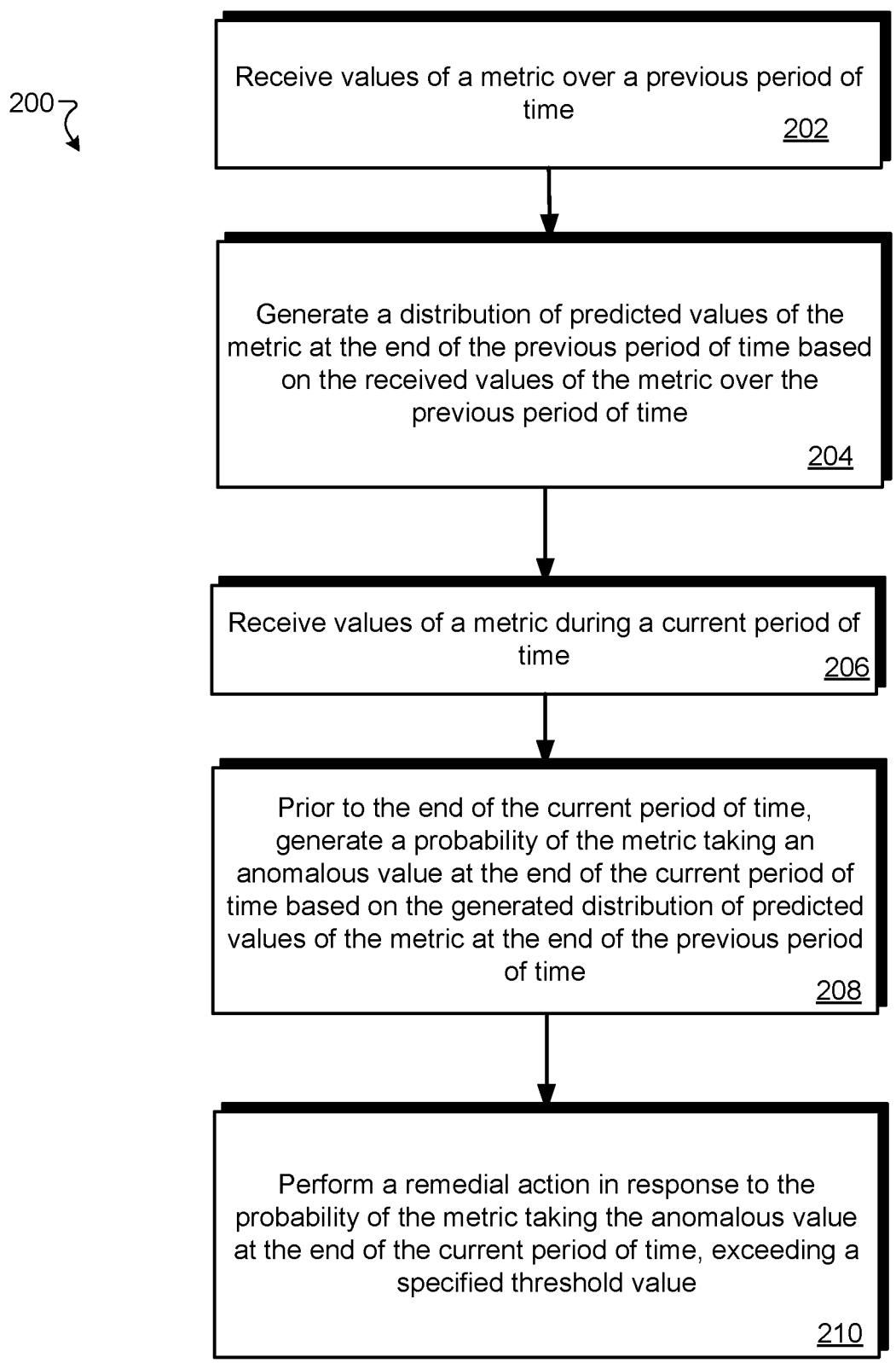
FIG. 2 is a flow chart that illustrates an example method of implementing the improved techniques as shown in FIG. 1.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the web server computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the web server computer 120. As illustrated in FIG. 2, the memory 126 is configured to store various data, including metric value data 132, predicted metric value data 144, probability data 146, and website data 162.

FIG. 2 is a flow chart depicting an example method 200 of forecasting metric values. The method 200 may be performed by software constructs described in connection with FIG. 1, which reside in memory 126 of the web server computer 120 and are run by the set of processing units 124.

At 202, the web server computer 120 (FIG. 1) receives values of a metric during a previous period of time. For example, the web server computer 120 may receive a number of bounces from the website during the middle of a day, e.g., up until 2 PM that day. The web server computer may receive such values through aggregation of bounce messages sent from a website manager, e.g., website manager 160. At 204, the web server computer 120 generates a distribution of predicted values of the metric at the end of the previous period of time based on the received values of the metric over the previous period of time. At 206, the web server computer 120 receives values of a metric during a current period of time.

At 208, prior to the end of the current period of time, the web server computer 120 generates a probability of the metric taking an anomalous value at the end of the current period of time based on previous values of the metric. For example, the probability computation manager 140 may compute a distribution of predicted end-of-day metric values (at 204) and determine whether a new predicted end-of-day metric value is outside of a 2.5-97.5 percentile confidence range. Alternatively, the probability computation manager 140 may compute a probability of the new value indicating an anomaly based on a cumulative distribution of predicted end-of-day values of the metric.

At 210, the web server computer 120 performs a remedial action in response to the probability of the metric taking on an anomalous value at the end of the current period of time exceeding a specified threshold. For example, if a predicted end-of-day number of bounces exceeds a 97.5 percentile, then the alert manager 150 may generate and send an alert to a user warning the user that the number of bounces is in a range indicating anomalous behavior of the web traffic. Alternatively, if the probability computation manager 140 determines that a probability of the end-of-day number of bounces exceeds a number considered anomalous, then the alert manager 150 may issue an alert to the user.

As discussed above, determining whether a predicted end-of-period metric value is anomalous involves generating such end-of-day predicted values. Herein four example techniques of generating such predicted end-of-day values are described with regard to FIGS. 3-7.

Figure 3:
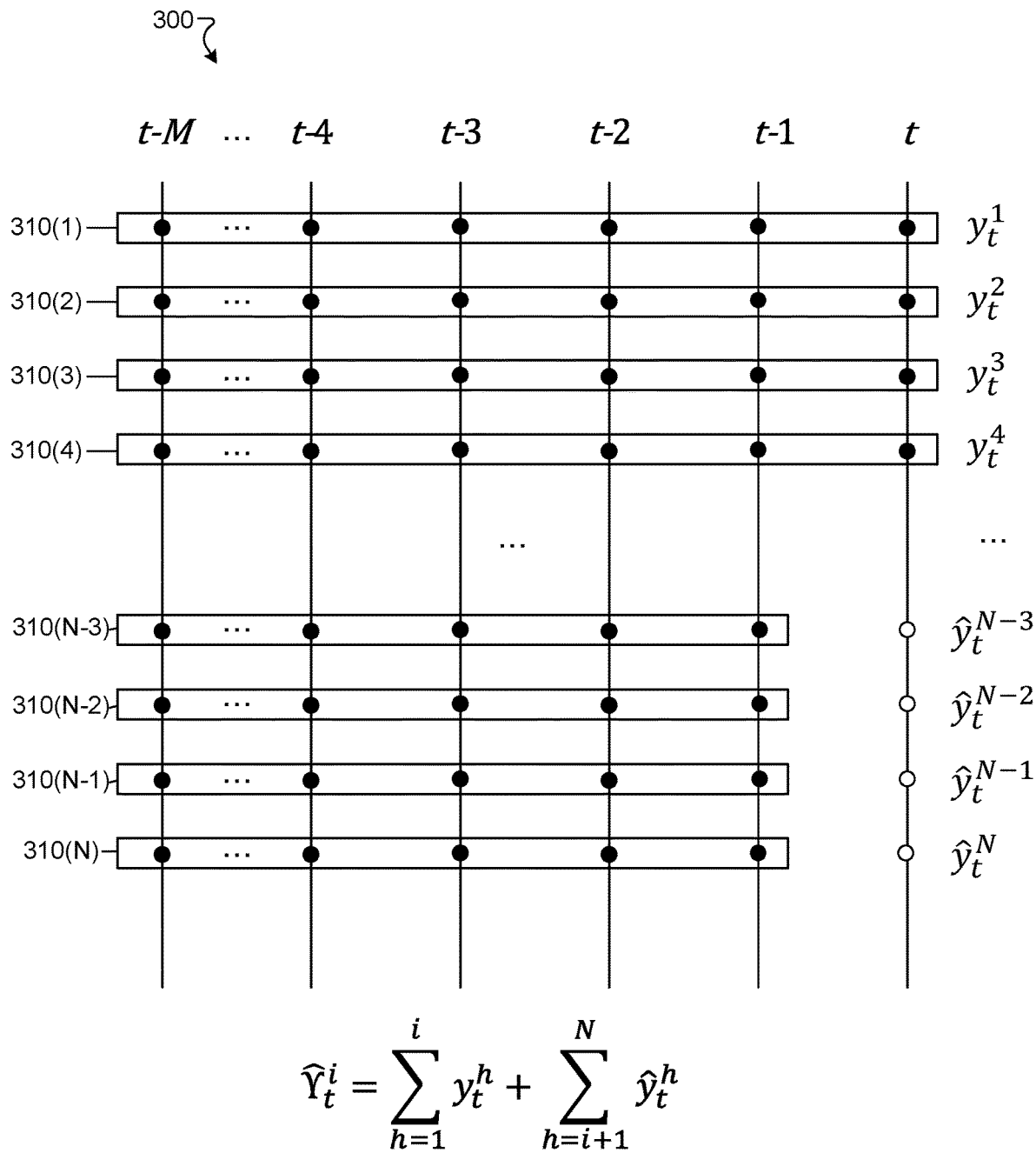
FIG. 3 is a diagram that illustrates example separate subperiod models used to make end-of-period metric value predictions according to a first aspect of the improved techniques shown in FIG. 1.

FIG. 3 illustrates a first aspect of the improved techniques which involves a prediction framework 300 including separate subperiod models 310(1), 310(2), . . . , 310(N), each of which is used to make subperiod metric value predictions. As shown in FIG. 3, each actual metric value for a subperiod is represented by a filled circle, while each predicted metric value at the end of a subperiod is represented by an open circle. Each row of circles corresponds to the same subperiod within a period, while each column of circles corresponds to the values obtained or predicted in a single period. Each rectangular box around acquired actual metric values represents a model that may be built from those values.

At the end of a subperiod h at the current period of time t, the metric value acquisition manager 130 (FIG. 1) acquires an actual metric value $y_t^h$, where $h \in \{1, 2, \ldots, N\}$. (For example, when the period is a day, then a subperiod may be an hour so that N=24.) Each subperiod predicted metric value $\hat{y}_t^1$ at the subperiod h within the current period t may then be used to make a separate end-of-period prediction $\hat{Y}_t^h$. Such an end-of-period prediction $\hat{Y}_t^h$ may be compared to an actual end-of-period metric value $Y_t^h$ after the end of the period t.

The predicted end-of-period metric is computed by summing up the actual subperiod metric values and the predicted subperiod metric values. As illustrated in FIG. 3, the subperiods $h \in \{1, 2, \ldots i\}$ have passed and actual metric values for those subperiods obtained. Thus, the predicted end-of-period metric may be written mathematically as follows:

$$\hat{Y}_t^i = \sum_{h=1}^{i} y_t^h + \sum_{h=i+1}^{N} \hat{y}_t^h.$$

In some implementations, each of the separate models 310(i+1), . . . , 310(N) as illustrated in FIG. 3 involves an exponential time series (ETS), also known as exponential smoothing. When the period of time is a day, and the subperiods are an hour with N=24, then the hourly ETS model at hour h is trained using actual metric values $y_{t-1}^h$, $y_{t-2}^h, y_{t-3}^h, \ldots, y_{t-M}^h$, where in some implementations M=30, but by no means is this a requirement and M may take on larger or smaller values.

In some implementations, each subperiod ETS model may be periodic. For example, in the hourly ETS subperiod model with M=30 described above, the hourly ETS model may assume periodic behavior with a period of seven days (i.e., weeks over a month). In this case, the ETS model is further fit with periodic functions, e.g., a trigonometric series.

Figure 4:
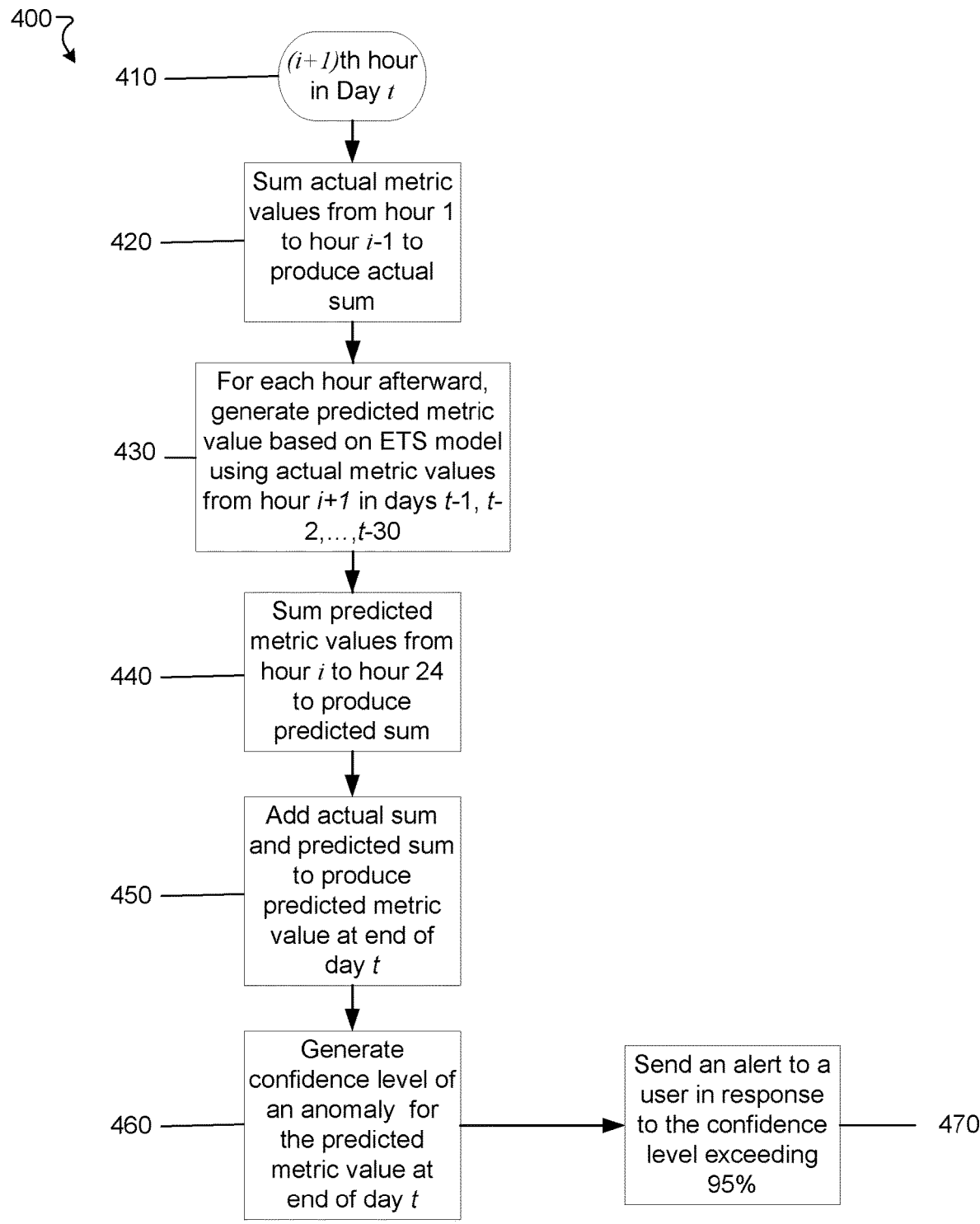
FIG. 4 is a flow chart that illustrates an example method of performing the first aspect of the improved techniques shown in FIG. 1.

FIG. 4 illustrates a flow chart that represents an example method 400 of forecasting metric values via the prediction framework 300 as shown in FIG. 3. The method 400 may be performed by software constructs described in connection with FIG. 1, which reside in memory 126 of the web server computer 120 and are run by the set of processing units 124.

At 410, the web server computer 120 (FIG. 1) begins the method 400 at hour i+1 in day t. At 420, the web server computer 120 performs a summation of actual metric values from hour 1 to hour i in day t to produce a sum of actual metric values for day t.

At 430, for each hour beginning at hour i+1, the web server computer 120 generates a predicted metric value for the hour based on the ETS model described above, i.e., M=30 and having a period of seven days. At 440, the web server computer 120 performs a summation of the predicted metric values from hour i+1 to hour 24 to produce a sum of predicted metric values for day t. At 450, the web server computer 120 performs a summation of the sum of actual metric values for day t and the sum of predicted metric values for day t to produce the end-of-day predicted value of the metric.

At 460, the web server computer 120 generates a confidence level for the predicted end-of-day metric value. For example, as discussed above, such a confidence level may be represented as a distribution of end-of-day predicted metric values generated by a bootstrapping technique. Along these lines, a 95% confidence of an anomaly may correspond to predicted end-of-day metric values above a 97.5 percentile and/or below a 2.5 percentile of the distribution.

At 470, when the confidence level of an anomaly exceeds 95%, the web server computer 120 sends an alert to a user indicating an expectation of an anomalous metric value at the end of the day.

While the framework 300 for predicting end-of-day metric values has the advantage of correctly representing the subperiod (e.g., hourly) behavior in many websites, each individual ETS model of subperiod behavior is independent of the other subperiod models. Another framework may be needed to learn how errors in the predictions from each subperiod affects other subperiod predictions.

Figure 5:
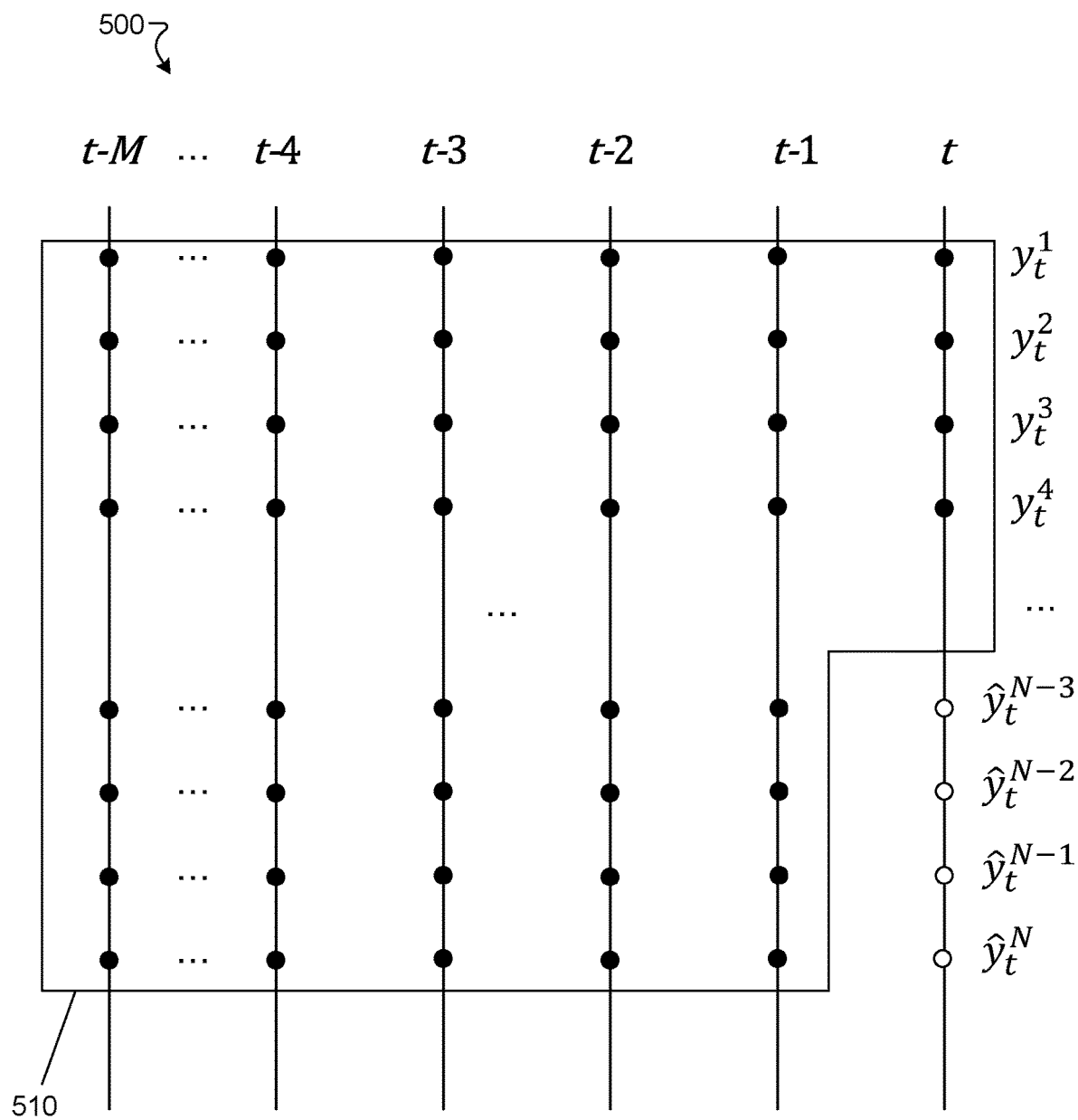
FIG. 5 is a diagram that illustrates an example single model used to make end-of-period metric value predictions according to a second aspect of the improved techniques shown in FIG. 1.

FIG. 5 illustrates a second aspect of the improved techniques which involves a prediction framework 500 including a single model 510 on which each subperiod prediction is based. As shown in FIG. 5, each actual metric value for a subperiod is represented by a filled circle, while each predicted metric value at the end of a subperiod is represented by an open circle. Each row of circles corresponds to the same subperiod within a period, while each column of circles corresponds to the values obtained or predicted in a single period. Each rectangular box around acquired actual metric values represents a model that may be built from those values. Because of the single ETS model for all previous actual metric values, the interaction between prediction errors ("residuals") at each subperiod may be derived and included in training subsequent models.

For the framework 500, the predicted end-of-period metric value is $$\hat{Y}_t^i = \sum_{h=1}^{i} y_t^h + \sum_{h=i+1}^{N} \hat{y}_t^h.$$

In the framework 500, though, the predicted metric value computation manager 142 retrains the single ETS model 510 every subperiod as a new data point is acquired by the metric value acquisition manager 130. However, the retraining within period t involves the predicted metric value computation manager 142 performing a fit of the actual metric values for subperiods i, i–1, i–2, . . . using parameters estimated at the beginning of period t. In this way, within period t, there is no learning from the residuals that results in a change in estimated parameter values. Rather, the learning from the residuals is performed at the beginning of each new period.

Figure 6:
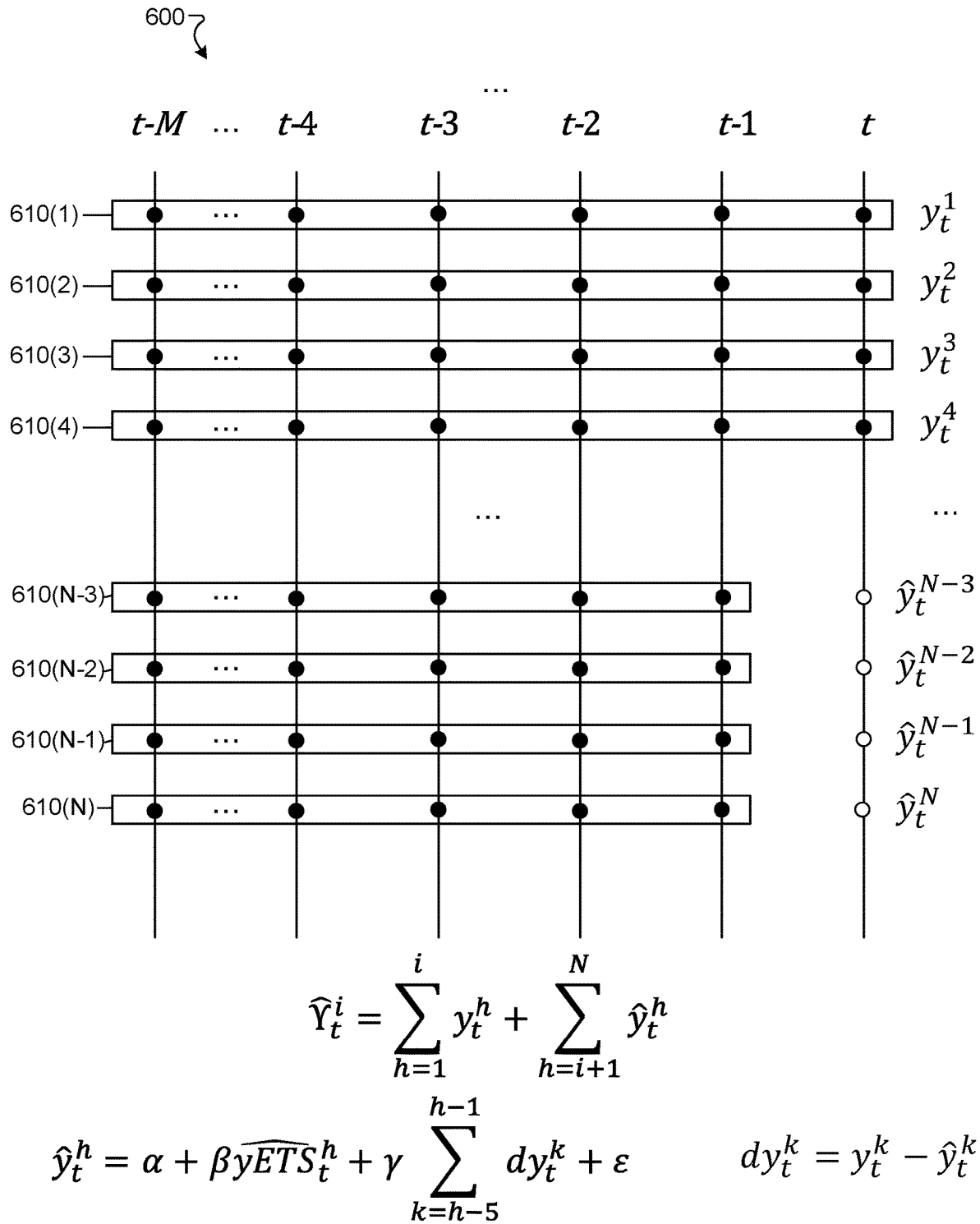
FIG. 6 is a diagram that illustrates example separate subperiod models used to make end-of-period metric value predictions based on a linear regression of each separate model and errors between prior predicted values and actual values according to a third aspect of the improved techniques shown in FIG. 1.

FIG. 6 illustrates a third aspect of the improved techniques which involves a prediction framework 600 including separate subperiod models 610(1), 610(2), . . . , 610(N), each of which is used to make subperiod metric value predictions. Nevertheless, the prediction framework 600 differs from the prediction framework 300 in that, while the latter made no use of residuals in updating the ETS models, the former does so using a linear regression model. Accordingly, while the prediction framework 600 the predicted end-of-period metric value is, again, $$\hat{Y}_t^i = \sum_{h=1}^{i} y_t^h + \sum_{h=i+1}^{N} \hat{y}_t^h,$$

the process of computing the predicted subperiod metric value $\hat{y}_t^h$ is changed to account for residuals.

In particular, the linear regression expression is based on several parameters as follows:

$$\hat{y}_t^h = \alpha + \beta \overline{yETS}_t^h + \gamma \sum_{k=h-5}^{h-1} dy_t^k + \varepsilon,$$

where $\overline{yETS}_t^h$ is the subperiod metric value as predicted by the subperiod ETS model at period t and hour h, $dy_t^k = y_t^h - \hat{y}_t^k$, $\alpha$, $\beta$, and $\gamma$ are the regression coefficients, and $\varepsilon$ represents regression noise. Note that the sum over the residuals represents the error in the previous five subperiods. In some implementations, this summation may be over a different number of subperiods, e.g., three, four, six, seven, and so on.

In the framework 600, the predicted metric value computation manager 142 retrains the subperiod ETS models, i.e., the predicted metric value computation manager 142 determines new weights for the exponential smoothing model of each subperiod, at each period. When the period is a day and the subperiod is an hour, then the predicted metric value computation manager 142 trains each ETS subperiod model using actual metric value data from the past 30 days with a periodicity of seven days.

Further, the predicted metric value computation manager 142 retrains the linear regression model above, i.e., the predicted metric value computation manager 142 determines new values of $\alpha$, $\beta$, and $\gamma$ each period. In some implementations, the predicted metric value computation manager 142 performs this retraining using a least-squares best fit. In some implementations, the predicted metric value computation manager 142 performs this retraining using a robust estimation scheme, e.g., least-absolute-error best fit.

There are some cases in which the residual $dy_t^k$ is not directly calculable. For example, when the periods are days and the subperiods are hours, the residual $dy_t^{14}$ for hour h=12 cannot use the residual for hour 13. In this case, the predicted metric value computation manager 142 uses the residuals $dy_t^{10}$, $dy_t^{11}$, and $dy_t^{12}$ to extrapolate the residual $dy_t^{13}$.

Figure 7:
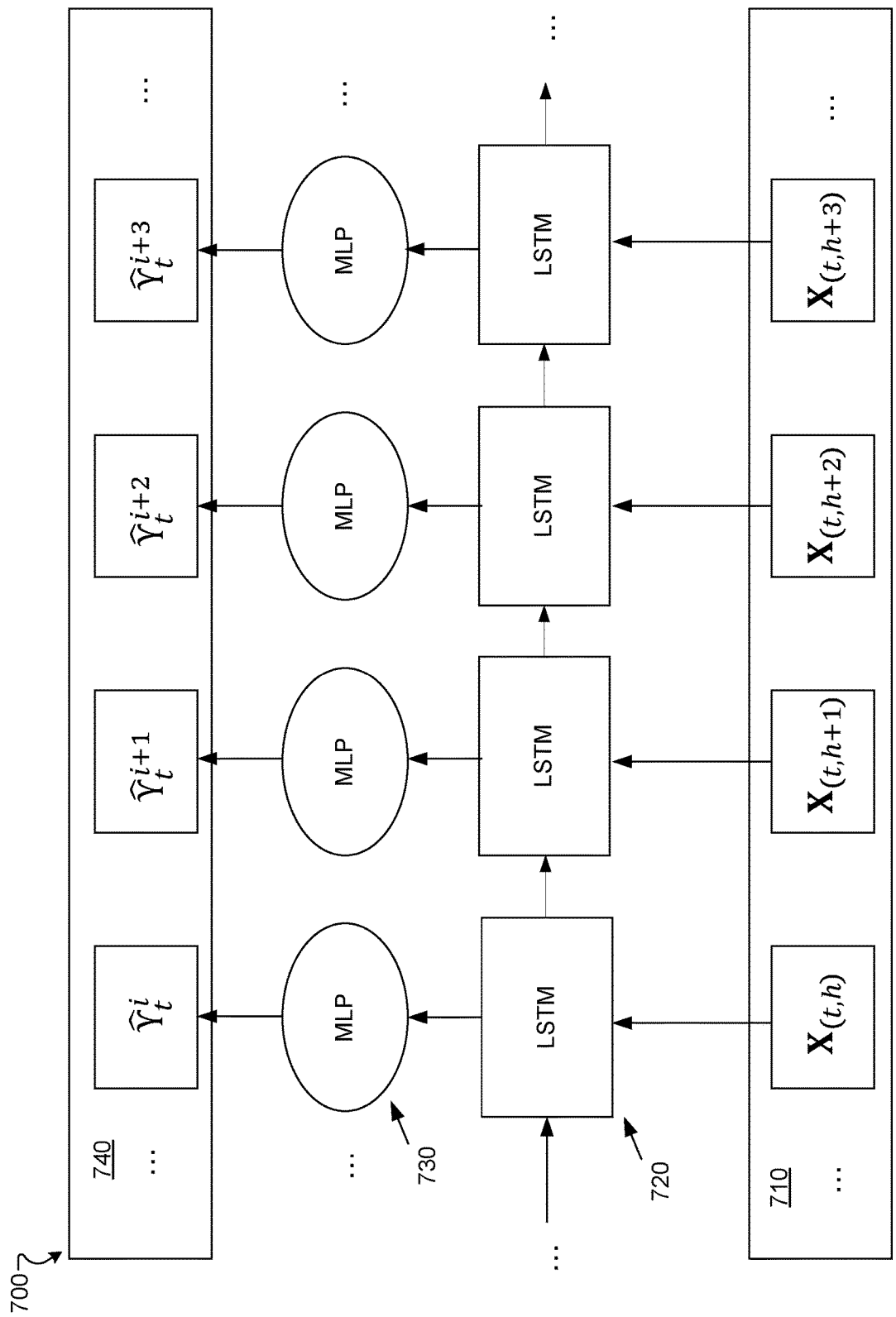
FIG. 7 is a diagram that illustrates an example long short-term memory (LSTM) recurrent neural network (RNN) according to a fourth aspect of the improved techniques shown in FIG. 1.

FIG. 7 illustrates a fourth aspect of the improved techniques which involves a prediction framework 700. The prediction framework 700 involves a long short-term memory (LSTM) recurrent neural network (RNN). A RNN is a machine learning structure for approximating arbitrary functions of input data. When the input represents sequential data such as a time series, an RNN enables inputs from previous times to influence model output at subsequent times. The LSTM variant of an RNN allows for modeling dependencies for time series values separated by longer time steps. (Without the LSTM variant, the repeated application of sigmoidal activation functions in the RNN will cause underflow in the computation of the gradients of the activation functions, which are needed for residual computation.)

Illustrated in FIG. 7 is the LSTM model framework 700. The LSTM model framework includes an input layer 710, a single LSTM layer 720, a multi-layer perceptron (MLP) 730, and an output layer 740. The times series of input data is assumed to be taken from a sequence of the form $\{\ldots, y_t^h, y_t^{h+1}, y_t^{h+2}, \ldots, y_t^{h+N}, y_{t+1}^1, y_{t+1}^2, \ldots\}$, where, as above, the period has N subperiods.

The input layer 710 includes a time series of input vectors $X_{(t,h)} = [y_t^h, h]$, i.e., when the period is a day and the subperiod is an hour, the input vectors include hourly values along with an index that represents the hour of a day. As shown in FIG. 7, the predicted metric value computation manager 142 inputs each input vector into the RNN at its respective hour.

The LSTM layer 720 includes a series of LSTM cells and has 36 output units. Each LSTM cell takes in one input vector $X_{(t,h)}$ at a time step, e.g., an hour. Further, each LSTM cell also takes in output from a previous LSTM cell, i.e., the LSTM cell that took the input vector $X_{(t,h-1)}$ as input. Inside each LSTM cell, there are input gates which admit or block input according to a set of weighted sigmoidal functions that leaves the input untouched or suppresses the input. There are also output gates which control whether an output value that is fed into a MLP layer may also be fed into the next LSTM cell, and vice-versa. The output of a LSTM layer that is input into a MLP layer is expressed mathematically as follows:

$$h_t^i = f_{LSTM}(X_{(t,i)}),$$

where $f_{LSTM}$ is the overall LSTM activation function and $h_t^i$ represents the 36 output values of the LSTM layer at hour i of day t.

The MLP 730 includes a series of MLP cells with two layers having output dimensions of 36 and 1 (going from input to output). MLP 730 is a feedforward neural network that uses sigmoidal activation functions and backpropagation of errors for learning. Each MLP cell returns a predicted end-of-day metric value:

$$\hat{Y}_t^i = g_{MLP}(h_t^i),$$

where $g_{MLP}$ is the MLP, or final activation, function.

Each cell in the LSTM layer 720 and the MLP layer 730 uses sigmoidal activation functions except for the final layer of the MLP which outputs the predicted end-of-day metric value $\hat{Y}_t^i$. To train the LSTM and MLP cells, the predicted metric value computation manager 142 uses a stochastic gradient descent algorithm with mean-squared error as a loss criterion.

The output of the LSTM RNN framework 700, i.e., the predicted end-of-day metric value $\hat{Y}_t^i$, may also need a confidence interval defined to identify anomalous end-of-day matric values. Within the LSTM RNN framework 700, the probability manager 140 uses a bootstrapping procedure to define the confidence intervals.

Figure 8:
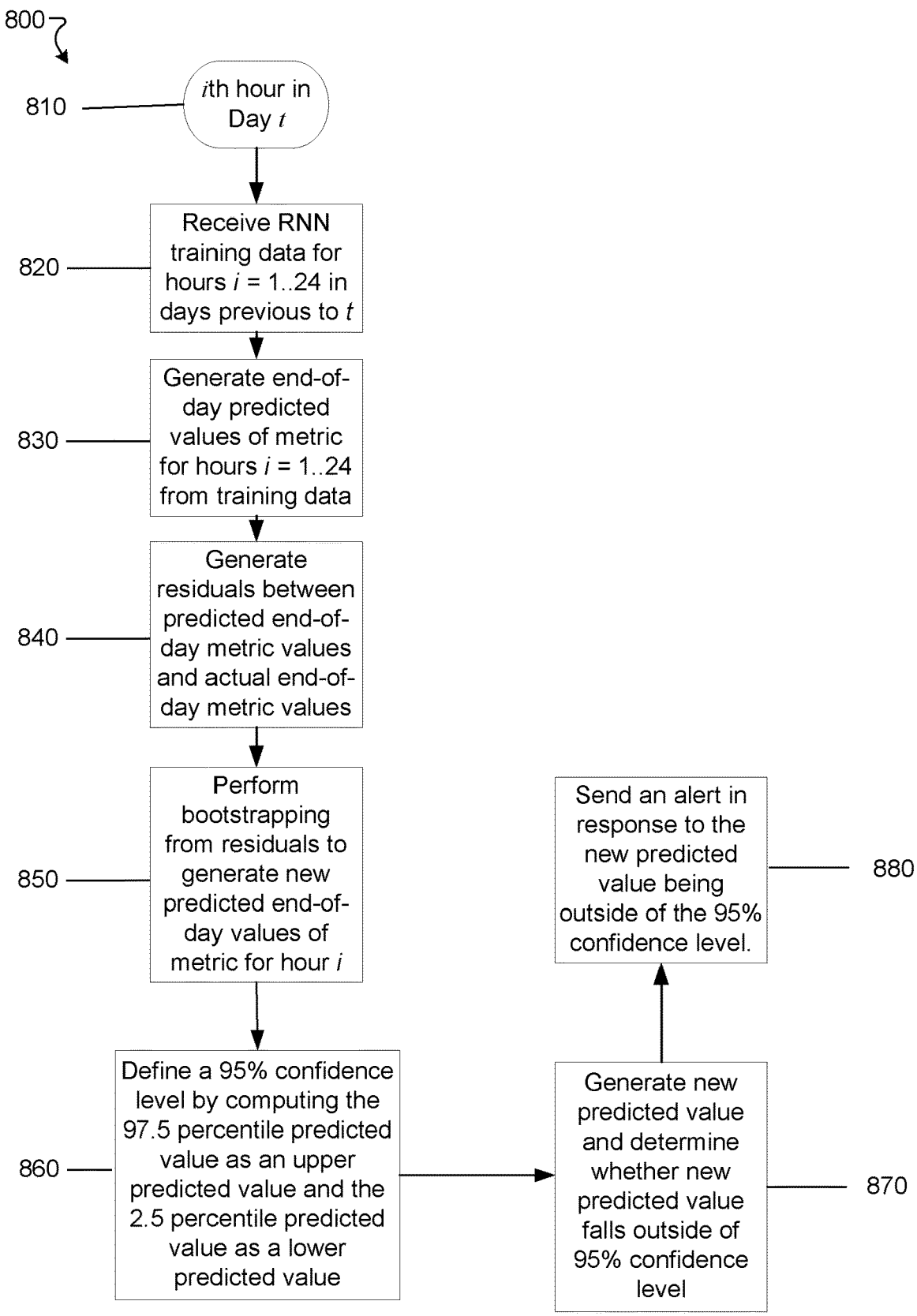
FIG. 8 is a flow chart illustrating an example method of deriving a confidence interval and determining whether new predictions fall outside of that confidence interval according to the fourth aspect of the improved techniques shown in FIG. 1.

FIG. 8 illustrates a flow chart that represents an example method 800 of training and using the prediction framework 700 as shown in FIG. 7. The method 800 may be performed by software constructs described in connection with FIG. 1, which reside in memory 126 of the web server computer 120 and are run by the set of processing units 124.

At 810, the web server computer 120 (FIG. 1) begins the method 800 at hour i in day t. At 820, the web server computer 120 receives training data for all hours (subperiods) in a specified number of previous days (periods), e.g., 30, that will herein be called the set of training days $\mathbb{T}$. The training data includes actual metric values aggregated by the metric value aggregation manager 130 as described above, as well as actual end-of-day metric values.

At 830, the web server computer 120 generates end-of-day predicted metric values $\hat{Y}_t^i$ for days $t \in \mathbb{T}$ at hours i=1, 2, ..., 24 from the training data using the LSTM RNN. At 840, the web server computer 120 generates residuals $e_t^i$ between the predicted end-of-day metric values $\hat{Y}_t^i$ and actual end-of-day metric values $Y_t^i$ for hours i=1, 2, ..., 24. Accordingly, at this point the residuals may be expressed as follows:

$$e_t^i = Y_t^i - \hat{Y}_t^i, i \in \{1,2,\ldots,24\}, t \in \mathbb{T}.$$

At 850, the web server computer 120 performs a bootstrapping operation to produce new predicted end-of-day metric values at hour i within day t. In some implementations, the bootstrapping operation involves sampling the residuals $e_t^i$ for all $e_t^i = Y_t^i - \hat{Y}_t^i$, $i \in \{1, 2, \ldots, 24\}$, $t \in \mathbb{T}$ at random with replacement and adding each sampled residual to the predicted end-of-day metric value $\hat{Y}_t^i$. This sampling and adding may be iterated for some number K of times. Thus, the new end-of-day metric values at hour $i \in \{1, 2, \ldots, 24\}$ and day $t \in \mathbb{T}$ may be expressed mathematically as follows:

$$Y_t^{i,(K)} = \hat{Y}_t^i + e_t^{i,(K)},$$

where $e_t^{i,(K)}$ is the $K^{th}$ sampled residual and $Y_t^{i,(K)}$ is the $K^{th}$ end-of-day metric value at hour i within day t. For example, K may be 100, but it can be less than or greater than 100 as well. These new end-of-day metric values become a new dataset to be input into the RNN, which, at the $K^{th}$ bootstrapping iteration, produces predicted values of the $K^{th}$ end-of-day metric value $\hat{Y}_t^{i,(K)}$ at hour i within day t.

At 860, the web server computer 120 uses the predicted values of the $K^{th}$ end-of-day metric value $\hat{Y}_t^{i,(K)}$ at hour i within day t to define a confidence interval, e.g., a 95% confidence interval. Along these lines, the K predicted end-of-day metric values may form a probability distribution. For a 95% confidence interval, the web server computer 120 determines the 2.5 percentile metric value $\hat{Y}_{t,2.5}^i = \tau_{lower}(i)$ as a lower predicted value and the 97.5 percentile metric value $\hat{Y}_{t,97.5}^i = \tau_{upper}(i)$ as an upper predicted value.

At 870, the web server computer 120 uses the lower predicted value and the upper predicted value to determine whether a new predicted end-of-day metric value may indicate an anomaly. For example, a user or the web server computer 120 may provide upper and lower thresholds $y_{th}^{upper}$ and $y_{th}^{lower}$. The upper and lower thresholds correspond to the maximum and minimum end-of-day metric values that a forecast of the metric values can achieve with 95% confidence. Accordingly, if either of the following conditions are met:

$$y_{the}^{lower} > \tau_{upper}(i),$$

$$y_{th}^{upper} < \tau_{lower}(i),$$

then an anomaly may be indicated.

In some implementations, the web server computer 120 may also perform another bootstrapping operation similar to that performed at 850 to generate probabilities of the end-of-day metric value crossing either threshold. Such probabilities take the following form:

$$Pr(Y_t^i > y_{th}^{upper}) = \frac{1}{K}\sum_{b=1}^{K}\Theta(\hat{Y}_t^i + e_t^b > y_{th}^{upper}),$$

$$Pr(Y_t^i < y_{th}^{lower}) = \frac{1}{K}\sum_{b=1}^{K}\Theta(\hat{Y}_t^i + e_t^b < y_{th}^{lower}),$$

where $e_t^b$ is the sampled error estimate in the $b^{th}$ iteration through bootstrapping and $\Theta$ is a logical function that returns 1 if its argument is true and 0 if its argument is false.

At 880, the web server computer 120 generates and sends an alert if (1) either condition regarding the upper and lower threshold above is met or (2) either probability expressed above exceeds 0.95.

Figure 9:
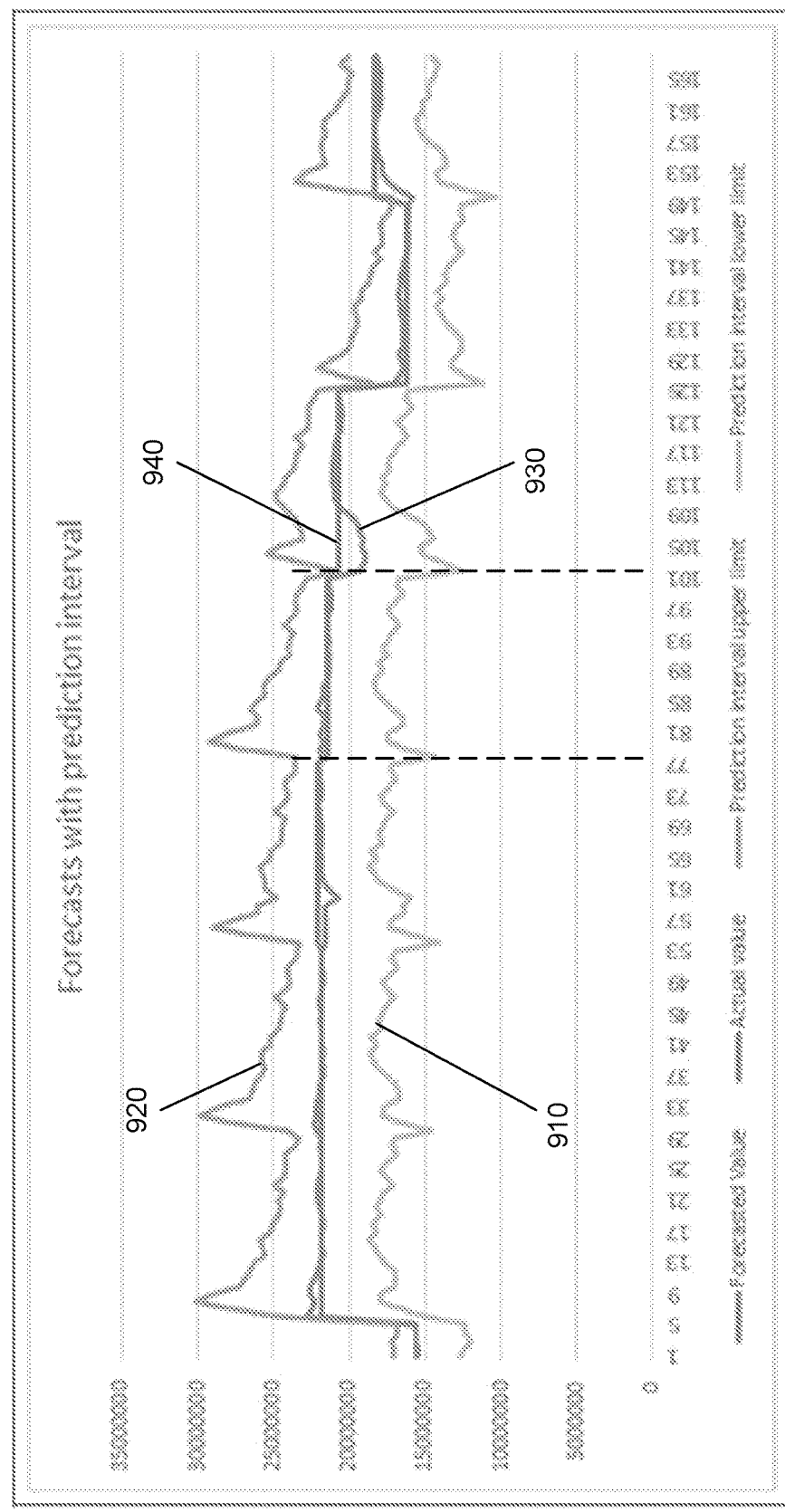
FIG. 9 is a diagram that illustrates a graph of example predicted and actual values of a metric generated over a week according to the fourth aspect of the improved techniques shown in FIG. 1.

FIG. 9 is a diagram that illustrates a graph of example predicted and actual values of a metric generated over a week according to the framework 700 and method 800. In this graph, the lower predicted values 910 generated over a week may be observed, as well as the upper predicted values 920, the predicted end-of-day metric values 930, and the actual end-of-day metric values 940, on an hourly basis. The graph in FIG. 9 makes clear that, as a day progresses, the difference between upper predicted value and lower predicted value decreases, indicating that the confidence of the model is increasing as the day progresses.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit). Method steps may also be performed in a different order than illustrated in the figures.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method, comprising:
   receiving, by processing circuitry of a web server configured to host a website and analyze metrics related to the website, values of a metric over a previous period of time;
   receiving, by the processing circuitry, values of the metric during a current period of time, wherein each of the received values of the metric corresponds to a subperiod of the previous period of time;
   during the current period of time, predicting an end-of-period value of the metric for the current period of time based on the received values of the metric, wherein the end-of-period value is predicted using a recurrent neural network (RNN) including a plurality of LSTM cells, and wherein the end-of-period value of the metric is predicted by:
      predicting a first estimate of the end-of-period value of the metric for the current period of time during a first subperiod of the current period of time using a first LSTM cell based on a first plurality of values of the metric for subperiods of the current period of time prior to the first subperiod; and
      predicting a second estimate of the end-of-period value of the metric for the current period of time during a second subperiod of the current period of time using a second LSTM cell based on the first end-of-period value and a second plurality of values of the metric including the first plurality of values of the metric;
   generating, by the processing circuitry, a probability of the metric having an anomalous value at an end of the current period of time based on the predicted end-of-period value and the received values of the metric over the previous period of time; and
   performing, by the processing circuitry, a remedial action in response to the probability of the metric having the anomalous value at the end of the current period of time exceeding a specified threshold value.

2. The method as in claim 1, wherein performing the remedial action in response to the probability of the metric exceeding the specified threshold value includes generating an alert and sending the alert to a user.

3. The method as in claim 1, wherein performing the remedial action in response to the probability of the metric exceeding a specified threshold value includes:
   prior to the end of the current period of time, obtaining an expected value of the metric at the end of the current period of time; and
   performing an adjustment on the expected value of the metric at the end of the current period of time based on the probability of the metric having the anomalous value to produce an adjusted expected value of the metric at the end of the current period of time.

4. The method as in claim 1, wherein the current period of time is a latest period of time of a plurality of periods of time,
   wherein each of the plurality of periods of time is divided into subperiods of time over the plurality of periods, and
   wherein generating the probability of the metric having the anomalous value at the end of the current period of time includes producing, for the first subperiod and the second subperiod, a first model corresponding to the first subperiod and a second model corresponding to the second subperiod, the probability being based on the first model and the second model.

5. The method as in claim 4, wherein the first model and the second model are each periodic with the same period.

6. The method as in claim 4, wherein generating the probability of the metric having the anomalous value at the end of the current period of time further includes:
   forming a linear regression based on the first model and the second model, a first error between the first model and actual values of the metric in the first subperiod within the current period of time, and a second error between the second model and actual values of the metric in the second subperiod within the current period of time.

7. The method as in claim 4, wherein generating the probability of the metric having the anomalous value at the end of the current period of time further includes:
   producing, from the first model and the second model, a long short-term memory (LSTM) of the recurrent neural network (RNN), the LSTM including the first LSTM cell corresponding to the first subperiod and the second LSTM cell corresponding to the second subperiod, output from the first LSTM cell being input into a second LSTM cell.

8. The method as in claim 7, wherein generating the probability of the metric having the anomalous value at the end of the current period of time further includes:
   inputting the output from the first LSTM cell into a first multilayer perceptron whose output is a first predicted end-of-period value of the metric at the end of the current period of time; and inputting the output from the second LSTM cell into a second multilayer perceptron whose output is a second predicted end-of-period value of the metric at the end of the current period of time.

9. The method as in claim 4, further comprising:

generating a distribution of a plurality of end-of-period values of the metric includes:

generating a plurality of predicted values for the first subperiod using training data from the first subperiod within the plurality of periods and output from the first model; and producing an upper predicted value of the plurality of predicted values within a specified upper percentile and a lower predicted value of the plurality of predicted values within a specified lower percentile of the predicted values.

10. The method as in claim 9, wherein the upper percentile and the lower percentile define a confidence interval indicating the probability of the metric having the anomalous value at the end of the current period of time, wherein generating the probability of the metric having the anomalous value at the end of the current period of time further includes:

outputting a new predicted value of the metric for a period of time later than the plurality of periods of time; and determining whether the new predicted value is greater than the upper predicted value or lower than the lower predicted value, and wherein performing the remedial action in response to the probability of the metric exceeding the specified threshold value includes performing the remedial action in response to the new predicted value of the metric being greater than the upper predicted value or the new predicted value of the metric being less than the lower predicted value.

11. The method as in claim 9, wherein generating the plurality of predicted values for the first subperiod includes:

for each of the subperiods, generating a respective residual of a plurality of residuals, that residual being based on a difference between a predicted value of the metric at that subperiod and an actual value of the metric at that subperiod;

sampling the plurality of residuals at random; and adding each of the sampled residuals to the predicted value of the metric for the first subperiod within the previous period of time to produce the plurality of predicted values for the first subperiod.

12. The method as in claim 4, wherein the first model is distinct from the second model.

13. A computer program product comprising a nontransitory storage medium, the computer program product including code that, when executed by processing circuitry of a computer configured to host a website and analyze metrics related to the website, causes the processing circuitry to perform a method, the method comprising:

receiving values of a metric over a previous period of time, wherein the values of the metric over the previous periods of time comprise values of the metric corresponding to subperiods of the previous period of time;

receiving actual values of the metric during a current period of time, wherein each of the actual values of the metric corresponds to a previous subperiod of the current time period;

generating a plurality of predicted values of the metric for the current time period, wherein each of the predicted values corresponds to subperiod of the current time period and is generated using an exponential time series (ETS) model corresponding to the subperiod and trained using values of the metric corresponding to the subperiod from previous periods of time;

during the current period of time, predicting an end-of-period value of the metric for the current period of time by summing the actual values of the metric and the predicted values of the metric for the current period of time;

generating a probability of the metric having an anomalous value at the end of the current period of time based on the predicted end-of-period value; and performing a remedial action in response to the probability of the metric having the anomalous value at the end of the current period of time exceeding a specified threshold value.

14. The computer program product as in claim 13, wherein performing the remedial action in response to the probability of the metric exceeding the specified threshold value includes generating an alert and sending the alert to a user.

15. The computer program product as in claim 13, wherein performing the remedial action in response to the probability of the metric exceeding a specified threshold value includes:

prior to the end of the current period of time, obtaining an expected value of the metric at the end of the current period of time; and performing an adjustment on the expected value of the metric at the end of the current period of time based on the probability of the metric having the anomalous value to produce an adjusted expected value of the metric at the end of the current period of time.

16. The computer program product as in claim 13, wherein the current period of time is a latest period of time of a plurality of periods of time, wherein each of the plurality of periods of time is divided into subperiods of time, and wherein generating the probability of the metric having an anomalous value at the end of the current period of time includes producing, for a first subperiod over the plurality of periods and a second subperiod over the plurality of periods, a first model corresponding to the first subperiod and a second model corresponding to the second subperiod, the probability being based on the first model and the second model.

17. The computer program product as in claim 16, wherein generating the probability of the metric having an anomalous value at the end of the current period of time further includes:

forming a linear regression based on the first model and the second model, a first error between the first model and actual values of the metric in the first subperiod within the current period, and a second error between the second model and actual values of the metric in the second subperiod within the current period.

18. The computer program product as in claim 16, wherein generating the probability of the metric having an anomalous value at the end of the current period of time further includes:

producing, from the first model and the second model, a long short-term memory (LSTM) recurrent neural network (RNN), the LSTM including a first LSTM cell corresponding to the first subperiod and a second subperiod cell corresponding to the second subperiod, output from the first LSTM cell being input into a second LSTM cell.

19. The computer program product as in claim 17, wherein generating the distribution of a plurality of end-of-period values of the metric includes:
   generating a plurality of predicted values for the first subperiod using training data from the first subperiod within the plurality of periods and output from the first model; and
   producing an upper predicted value of the plurality of predicted values within a specified upper percentile and a lower predicted value of the plurality of predicted values within a specified lower percentile of the predicted values.

20. An electronic apparatus configured to host a website and analyze metrics related to the website, the electronic apparatus comprising:
   memory; and
   controlling circuitry coupled to the memory, the controlling circuitry being configured to:
      receive values of a metric over a previous period of time, wherein the values of the metric over the previous periods of time comprise values of the metric corresponding to subperiods of the previous period of time;
      receive actual values of the metric during a current period of time, wherein each of the actual values of the metric corresponds to a previous subperiod of the current time period;
      generating a plurality of predicted values of the metric for the current time period, wherein each of the predicted values corresponds to a subperiod of the current time period and is generated using an exponential time series (ETS) model corresponding to the subperiod and trained using values of the metric corresponding to the subperiod from previous periods of time;
      during the current period of time, predict an end-of-period value of the metric for the current period of time by summing the actual values of the metric for the current time period and the predicted values of the metric for the current period of time;
      generate a probability of the metric having an anomalous value at the end of the current period of time based on the received values of the metric over the previous time period and the predicted end-of-period value; and
      perform a remedial action in response to the probability of the metric having the anomalous value at the end of the current period of time exceeding a specified threshold value.

* * * * *